United States Patent

[11] 3,599,033

| [72] | Inventors | Robert L. Stettiner<br>Lexington;<br>William F. Craven, Sudbury; Dana C.<br>Finlayson, Everett, all of, Mass. |
|---|---|---|
| [21] | Appl. No. | 859,962 |
| [22] | Filed | Sept. 22, 1969 |
| [45] | Patented | Aug. 10, 1971 |
| [73] | Assignee | Hewlett-Packard Company<br>Palo Alto, Calif. |

[54] SYSTEM FOR SIMULTANEOUS DISPLAY OF ECG AND HEART RATE
8 Claims, 2 Drawing Figs.

[52] U.S. Cl. .................................. 315/18, 340/324.1
[51] Int. Cl. .................................. H01j 29/70
[50] Field of Search .................................. 315/18; 340/324.1

[56] References Cited
UNITED STATES PATENTS
3,469,252  9/1969  Bet .................................. 340/324

3,500,115  3/1970  Auger, Jr. .................................. 315/18
3,475,681  10/1969  Nerwin, Jr. et al .................................. 315/18

Primary Examiner—Rodney D. Bennett, Jr.
Assistant Examiner—N. Moskowitz
Attorney—Stephen P. Fox ABSTRACT: A cathode ray tube system receives a cardiac signal and simultaneously produces two displays corresponding to the analog form of the cardiac signal and the heartbeat rate. The displays are generated by separate horizontal and vertical deflection circuits which are alternately switched to drive the cathode ray tube beam. The display of the heart rate is a picture of a bar graph, the length of which changes to indicate the moving average of the heart rate. The bar graph is produced by generating a horizontal line raster and selectively blanking and unblanking the cathode ray tube. High and low limit markers and alarm circuitry associated with the bar graph display operate to indicate when the heart rate moves outside a preset range.

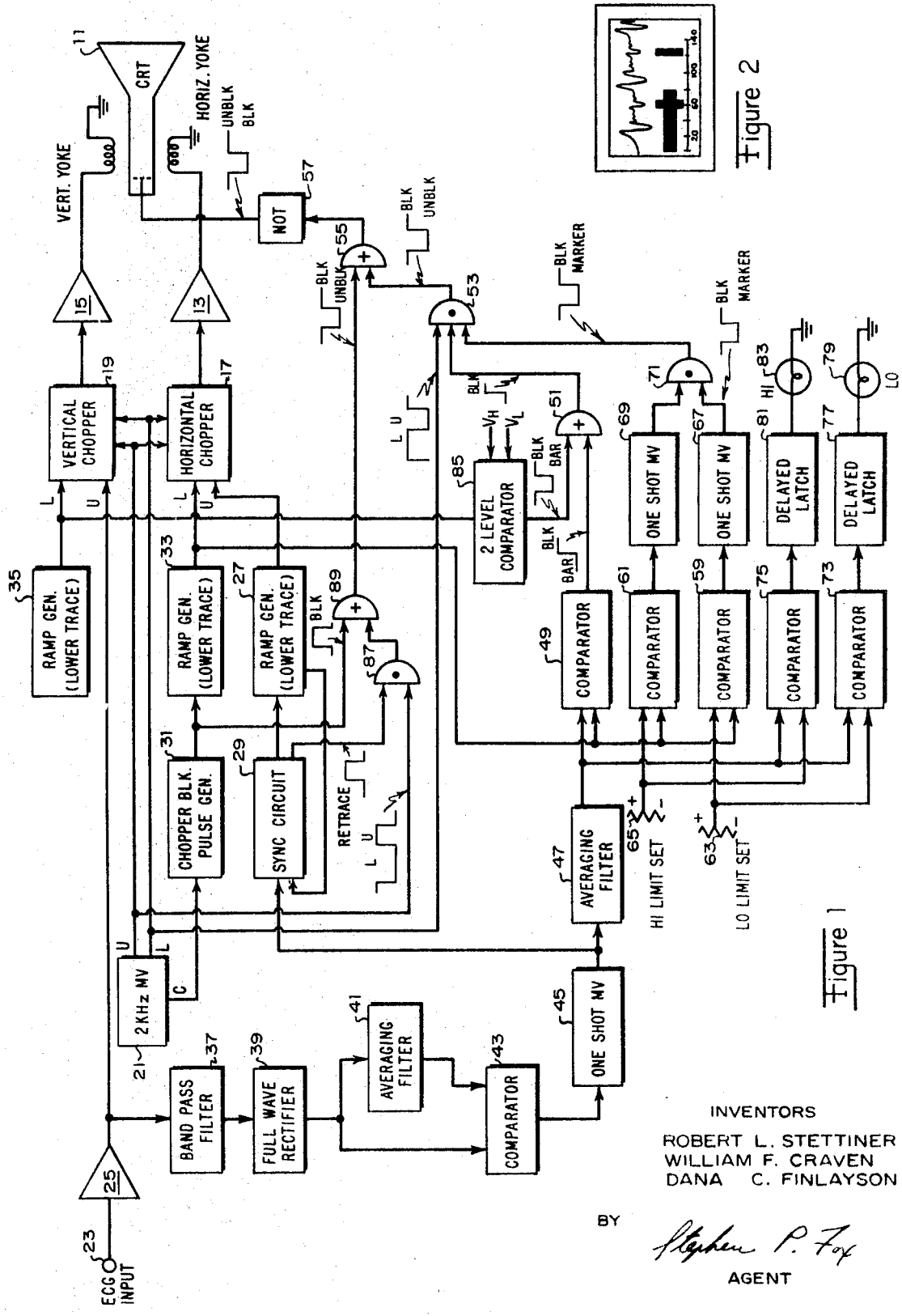

SYSTEM FOR SIMULTANEOUS DISPLAY OF ECG AND HEART RATE

BACKGROUND OF THE INVENTION

The present invention relates to systems for monitoring an electrocardiographic signal (ECG) and for presenting a visual display of the ECG signal on the screen of a cathode ray tube.

Systems for displaying ECG signals in analog form on a real time basis are well known. The prior art is replete with oscillographic devices for this purpose. However, the visual display of cardiac waveforms is only one aspect of cardiac monitoring. It is also desirable to monitor the heartbeat rate, which is usually measured by the recurrence rate of the qrs complex of the cardiac signal. Changes in the heartbeat rate are often indicative of damage to the heart tissue. For example, if a myocardial infarction occurs, it may lead to a condition of rapid heart beats (tachycardia) which in turn may progress into heart flutter, then fibrillation and ultimately death. In order to detect these conditions before they become fatal, it is important that the heart rate be monitored automatically and also displayed in a way that may be easily and quickly read. Preferably the heart rate is displayed simultaneously with the analog ECG signal so that a complete picture of the patient's heart activity may be viewed and interpreted by an observer.

SUMMARY OF THE INVENTION

The present invention provides a cathode ray tube (CRT) display of both the real time ECG signal and the moving average of the heart rate. The heart rate is presented in the form of a horizontal bar graph, the length of which changes along a scale so that the end thereof indicates the heart rate. The ECG signal and the bar graph are displayed simultaneously on the CRT screen so that both may be easily and quickly observed.

The illustrated embodiment of the invention includes two pairs of horizontal and vertical deflection circuits for the CRT beam. One pair of deflection circuits produces a horizontal trace across the upper portion of the CRT screen to display the magnitude of the cardiac signal as a function of time. The other pair of deflection circuits produces a raster of horizontal lines on the lower portion of the screen. This raster is selectively blanked and unblanked to display a picture of the bar graph. The CRT beam is switched back and forth between the two pairs of deflection circuits by synchronized horizontal and vertical choppers to generate both the upper analog trace and the lower bar graph on a time-sharing basis.

The selective blanking and unblanking of the bar graph raster is controlled by circuitry including tachometer means which receives the cardiac input signal and produces a DC signal level corresponding to the moving average of the heartbeat rate. This DC signal level controls the horizontal position along each line of the raster at which the tube is blanked, thereby to determine the length of the bar graph. For example, as the heart rate increases, the DC signal level increases so that the tube is not blanked until the beam moves further to he right, with he result that the length of the bar is extended.

Additional blanking and unblanking circuitry operates on he raster to display two markers spaced apart horizontally to define a desired range for the heart rate. The markers are positionable to set the low and high limits of the desired range. The width of the bar graph is limited to less than that of the markers so that the markers are clearly displayed. When the bar graph moves outside the preset range, an alarm circuit indicates an abnormally low or high heart rate.

BRIEF DESCRIPTION OF THE DRAWINGS

FIG. 1 is a block diagram of the preferred embodiment of the present invention.

FIG. 2 is front view of the cathode ray tube of FIG. 1 illustrating the analog trace and bar graph display on the screen thereof.

DESCRIPTION OF THE PREFERRED EMBODIMENT

Referring now to FIG. 1, there is shown a cathode ray tube (CRT) 11, the beam of which is deflected by horizontal and vertical yoke coils which are driven respectively by the amplifiers 13, 15. The two driver amplifiers 13, 15 receive signals from the horizontal and vertical chopper switches 17, 19, respectively. The horizontal chopper 17 has two inputs, designated U and L, which receive two different horizontal deflection signals. Similarily, the vertical chopper 19 has two inputs responsive to two different vertical deflection signals. Each of the choppers 17, 19 is gated by clock pulses from a multivibrator 21 operating at a frequency of two kilohertz (kHz.). The U and L clock pulse outputs of the multivibrator 21 are complements of one another, and a high level pulse on one of these outputs gates the choppers 17, 19 to cause them to couple the corresponding ones of their U and L inputs to the driver amplifiers 13, 15. The clock pulses gate the two choppers in synchronism so that both U inputs and both L inputs are alternately coupled to the CRT 11 for predetermined time periods during each clock cycle.

FIG. 2 illustrates the displays traced by the beam on the screen of the CRT 11. The upper trace is a real time display of an ECG waveform and is produced by a pair of horizontal and vertical deflection circuits coupled respectively to the U inputs of the horizontal and vertical choppers 17 and 19. The lower trace is a bar graph illustration of the heart rate and is produced by a different pair of horizontal and vertical deflection circuits coupled to the L inputs to the two choppers. Due to the switching operation of the two choppers 17, 19, the upper and lower traces are produced on a time sharing basis and appear simultaneously on the screen. The switching operation and the two pairs of deflection circuits are hereinafter described.

The ECG signal from a patient is applied to an input terminal 23 and amplified by an amplifier 25, which may include slew - rate limiting circuitry for attenuating undesired signals such as pulses from a cardiac pacemaker. From the amplifier 25, the ECG signal is coupled to the two pairs of deflection circuits for the upper and lower displays.

As noted above, the upper display is a trace of the analog form of the ECG signal. This trace is produced by a deflection circuit including a ramp generator 27 which, when coupled through the U inputs to chopper 17, causes the CRT beam to move horizontally across the screen at a slow predetermined sweep rate on the order of 2 or 4 seconds for a 100 millimeter sweep. At the same time, the ECG amplitude is coupled through the U input to chopper 19 to deflect the beam vertically. The ramp signal from the ram generator 27 repeatedly sweeps the beam across the CRT screen. At the end of each cycle of the ramp signal, a synchronizing circuit 29 produces a pulse which blanks the CRT while the beam retraces. The synchronizing circuit 29 also responds to a pulse signal derived from the ECG signal to trigger the ramp generator 27 so that each cycle of the ramp signal begins coincidentally with an ECG pulse after the CRT beam retraces. The blanking and synchronizing circuits are described in more detail hereinafter.

Only a part of the ECG signal is traced on the upper display during each cycle of the multivibrator clock 21 because the clock frequency is higher than that of the ramp generator 27. After a predetermined time interval during each clock cycle, the U and L outputs of the clock 21 change states to effect switching of the choppers 17, 19, from their U inputs to their L inputs to thereby cause a portion of the lower display to be traced. Each time that the U and L output of the clock 21 change states, a pulse is produced at the "C" output thereof which triggers a pulse generator 31. The pulse generator 31 produces an output pulse which blanks the CRT during the chopper-switching time, as hereinafter described, and also triggers a ramp generator 33, associated with the lower trace horizontal deflection circuit. The ramp generator 33, when triggered, produces a ramp signal which deflects the beam across the CRT screen at a rate much faster than that produced by ramp generator 27 and on the order of 140 microseconds for a 100 millimeter sweep. One horizontal line of the lower display is traced each time that the choppers 17, 19, are switched to their L inputs, and successive horizontal lines are displaced vertically from one another due to the small vertical deflection of the beam provided by another ramp generator 35. In effect, the horizontal and vertical ramp generators 33, 35 produce a line raster on the lower display in a manner similar to that used in television receivers.

As each line of the raster is traced on the lower display, he CRT beam is selectively blanked and unblanked to create a picture of a bar graph as well as two markers which vertically intersect the bar graph and indicate the high and low limits of a desired range for the heart rate. The length of the bar graph is controlled by a tachometer circuit which produces a DC signal level corresponding to he moving average of the heart rate.

The tachometer circuit includes a filter 37 which has a pass band on the order of 5—20 kHz. for discriminating the R-wave in the ECG signal. The R-wave is rectified by a full-wave rectifier 39, and the peaks of the R-waves are then detected by a peak detector circuit including an averaging filter 41 and a comparator circuit 43. The averaging filter 41 averages the last five R-waves received from a patient and produces an output signal corresponding to this average. The comparator 43 receives both the averaged R-wave signal and the real time R-wave signal and produces a pulse output whenever an R-wave exceeds the average signal. The comparator 43 has a minimum threshold level so that it will not trigger on spurious low level noise pulses in the event that the output from the averaging filter 41 is low due to the nonoccurrence of R-waves. Also the comparator 43 has a maximum threshold level so that the occurrence of a large amplitude heart beat due to a premature ventricular contraction (PVC), for example will not overshadow the effects of the following R-waves.

The pulses from the comparator 43 are standardized to a predetermined length by a one-shot multivibration 45, and the standardized pulses are then averaged by an averaging filter 47. The pulses from the one-shot multivibrator 45 are also coupled to the synchronizing circuit 29 which in turn synchronizes the upper trace horizontal ramp generator 27 to the ECG signal, as described hereinabove.

The output from the averaging filter 47 is a DC voltage having a magnitude which changes in accordance with the moving average of the heartbeat rate. This DC voltage is the tachometer signal and is fed to one input of a comparator 49. The other input to comparator 49 is the gradually increasing ramp signal from the ramp generator 33, which as described above, causes the CRT beam to trace horizontal lines on the lower display. As long as the magnitude of this ramp signal is less than that of the DC voltage from the averaging filter 47, the output of comparator 49 is maintained at a low level, corresponding to an unblanked condition of the cRT, so that a visible line comprising part of the bar graph is traced on the screen. However when the ramp signal exceeds the DC voltage, the output from comparator 49 switches to a high level to blank the CRT and remove the visible trace. The wave form illustrated adjacent to the output of comparator 49 indicates that a low level output designated "bar" will result in a visible trace which contributes to a portion of the bar graph picture; whereas the high level output designated "blk" operates to blank the CRT, thereby removing the visible trace. This selective blanking and unblanking signal is gated to the control grid of the CRT through the logic circuitry including an OR gate 51, an AND gate 53, another OR gate 55, and NOT gate 57. The selective blanking and unblanking achieved by the comparator 49 operates on each line of the raster to produce the bar graph.

The line raster display is also selectively blanked and unblanked to produce a picture of two vertical markers (FIG. 2) which are spaced apart to define the upper and lower limits of a desired range for the heartbeat rate indicated by the bar graph. This is achieved by circuitry including two comparators 59, 61 which compare the ramp signal from ramp generator 33 with low and high DC voltages from potentiometers 63, 65, respectively. When the increasing ramp signal reaches the DC voltage preset by potentiometer 63, the output signal from comparator 59 shifts from a high to a low level, which is turn triggers a one-shot multivibrator 67. The output of the one-shot multivibrator 67 is normally a high level signal, corresponding to a blanking signal for the CRT; however a low level marker pulse is produced thereby when a triggering signal is received from comparator 59. The relative levels of the output signal from the one-shot multivibrator 67 are shown by the wave form adjacent thereto.

The operation of comparator 61 is similar to that of comparator 59 described above. When the ramp signal input thereto reaches the DC level preset by potentiometer 65, comparator 61 triggers a one-shot multivibrator 69, which in turn produces a low level marker pulse. The DC level set by potentiometer 63 is lower than that set by potentiometer 65, so that the marker pulses from the one-shot multivibrators 67, 69 are produced in sequence as the CRT beam traces a horizontal line. The two marker pulses are coupled through an AND gate 71 and thence through the gates 53, 55, 57 to the grid of the CRT. As viewed in FIG. 2, the left-hand marker corresponds to the low limit and the right-hand marker corresponds to the high limit of the desired range of he heart rate. These two markers can be moved horizontally to any desired position of the CRT screen by merely adjusting the potentiometers 63, 65 to apply different DC voltage levels to the corresponding comparators 59, 61. The width of each marker on the screen corresponds to the widths of the marker pulses produced by the one-shot multivibrators 67, 69.

An alarm circuit is provided for indicating when the heart rate goes outside the range set by the low and high markers. The alarm circuit includes two comparators 73, 75, which respectively compare the tachometer signal from the averaging filter 47 with the voltage levels from the low and high limit set potentiometers 63, 65. When the tachometer signal drops below the low limit voltage set by potentiometer 63, the comparator 73 triggers a delayed latch circuit 77, which after a predetermined time interval energizes a lamp 79. Similarily, when the tachometer signal exceeds the high limit voltage set by potentiometer 65, the comparator 75 triggers a delayed latch 81 to light a lamp 83.

As noted above, the markers and the bar graph are generated simultaneously on the raster by selectively blanking each line thereof. In order to clearly distinguish the bar graph from the markers, the width of the bar graph is limited to less than that of the markers. This is achieved by a two-level comparator 85 which receives the ramp signal from the ramp generator 35 which controls the vertical displacement of the lines traces by the beam to produce the raster. The two level comparator 85 compares this ramp signal with low and high voltage levels $V_L$ and $V_H$, which are intermediate the minimum and maximum voltage levels attained by the ramp signal. The two-level comparator 85 produces a low-level output signal when the magnitude of the ramp signal is between the voltages $V_L$ and $V_H$, and a high level output signal at all other times. The voltages $V_L$ and $V_H$ are adjusted so that the high-level output occurs when the CRT beam is tracing a few horizontal lines at the bottom and top of the raster and the low level output occurs when the beam is tracing the middle lines in the raster. The output signal from comparator 85 is shown by the waveform adjacent thereto. This output signal is gated through the OR gate 51 and thence through the gates 53, 55, 57 to selectively blank the CRT and thereby limit the width of the bar graph. The logic gates operate so that the output from the two-level comparator 85 blanks only the bar graph and not the top and bottom portions of the markers. As a result, the markers generated are wider than the bar graph.

Considering now the operation of logic circuitry in more detail, when the lower display is being traced, the L output from the 2 kHz. clock 21 is a high-level signal, as shown by the wave form adjacent to the upper input to AND gate 53. At this time, the other two inputs to AND gate 53 from the OR gate 51 and AND gate 71 switch between high and low-signal levels to selectively unblank the CRT to produce The two markers and the bar graph, as described above. The output from AND gate 53 is applied to one input of OR gate 55. The other input to OR gate 55 is maintained at a low level while the beam is tracing the lower display, due to the low-level signal from the complementary U output of the 2 kHz. clock 21 which is coupled through an AND gate 87 and an OR gate 89. Therefore, the selective blanking and unblanking of each horizontal line of the raster is controlled solely by the outputs from OR gate 51 and AND gate 71. The output signal from OR gate 55 is inverted by the NOT gate 57 and fed to the grid of the CRT. According to common convention, a high level signal on the grid of the CRT unblanks the beam, whereas a low-level signal blanks the beam.

A short time after one line of the lower display raster is traced, the clock 21 switches states, which in turn gates the choppers 17, 19 so that the beam of the CRT is placed under control of the horizontal and vertical deflection circuits for the upper display. At this time, the input to AND gate 53 from the L output of clock 21 is maintained at a low level, with the result that the output of AND gate 53 holds one input to the OR gate 55 at a low level. At the same time, the U output from the clock 21 is at a high level, so that when the retrace blanking pulse is produced by the synchronizing circuit 29, it is gated through and gate 87 and thence through the gates 89, 55, 57 to the CRT. The retrace blanking pulse prevents a line from being traced as the beam returns to its starting point after completing the upper sweep and also prevents the bar graph from flashing when the beam retraces. Each time the clock 21 switches states, the blanking pulse from the pulse generator 31 is conducted through OR gate 89 and the gates 55, 57 to blank the CRT and thus prevent the beam from tracing a line as it moves between the upper and lower displays.

In summary, it can be seen that there are two main functions of the blanking circuits. One type of blanking signal is coupled to the upper input of OR gate 55 and operates to blank the CRT at the switching points of the clock 21 and during the retrace time when the beam is on the upper display. The other type of blanking signal is coupled to the lower input of the OR gate 55 and operates to generate both the bar graph and the two markers associated therewith. The composite blanking signal from OR gate 55 is applied through NOT gate 57 to the grid of the CRT.

As noted hereinabove, the horizontal sweep time for the upper trace is on the order of 2 to 4 seconds, which is much longer than the sweep time for the lower trace, which is on the order of 140 microseconds. The clock 21 operates the two choppers 17, 19 at a 2 kHz. rate so that each time the beam is switched to the upper horizontal and vertical deflection circuits, only a small portion of the horizontal trace is produced; whereas each time the beam is switched to the lower horizontal and vertical deflection circuits, one entire line of the raster is produced. One cycle of the outputs from the clock 21 is shown by the complementary wave forms adjacent to the inputs of AND gates 53 and 87. It can be seen that the portion of each clock cycle corresponding to the lower display is longer than that corresponding to the upper display. This is for the purpose of balancing the brightness between the two displays.

Both the bar graph and markers are referenced to a horizontal scale on the screen of the CRT (FIG. 2). The scale is numerically marked at increments to represent the heart beat rate. The moving average of the heart rate is indicated by the scale reading which is adjacent to the end of the bar graph, and the markers may be set to any desired points along the scale. Since the analog ECG signal is displayed simultaneously with the heart rate, both may be easily and quickly observed.

We claim:

1. A system for driving a cathode ray tube to display both a repetitive analog signal and the recurrence rate of said signal comprising:
   means for tracing said analog signal including:
      a first horizontal deflection circuit including ramp generator means for deflecting the beam of said cathode ray tube horizontally at a predetermined rate;
      a first vertical deflection circuit responsive to the magnitude of said analog signal;
   means for producing a bar graph indicative of the recurrence rate of said analog signal including:
      a second horizontal deflection circuit and a second vertical deflection circuit each including ramp generator means for deflecting said beam, thereby to produce a line raster;
      means responsive to said analog signal for producing a tachometer signal corresponding to the recurrence rate of said analog signal;
      means for comparing the magnitudes of said tachometer signal and the ramp signal from the ramp generator means of said second horizontal deflection circuit, said comparing means being operable to produce first and second output signals when the magnitude of said tachometer signal is respectively greater and less than that of said ramp signal; and
      means for gating said first and second output signals to said cathode ray tube to respectively blank nd unblank said beam;
   means for controlling the position of said beam to simultaneously display said analog signal and said bar graph, said controlling means including:
      horizontal chopper means for alternately coupling said first and second horizontal deflection circuits to said cathode ray tube; and
      vertical chopper means synchronized with said horizontal chopper means for alternately coupling said first and second vertical deflection circuits to said cathode ray tube.

2. The system of claim 1 further including means for producing display markers to indicate low and high limits of a desired range for said bar graph, said marker -producing means comprising:
   means for providing adjustable, predetermined low and high-potential levels;
   means for comparing the magnitude of said ramp signal with said low and high potential levels;
   means responsive to said last-named comparing means for generating low and high marker pulses in sequence when the magnitude of said ramp signal is equal to said low and high potential levels, respectively; and
   means for gating said marker pulses to said cathode ray tube to unblank said beam when it is tracing said line raster.

3. The system of claim 2 further including means for limiting said bar graph to a predetermined width which (FIG. 2) less than the width of said markers, said limiting means comprising:
   means for providing predetermined low and high-potential levels;
   means for comparing said last named low and high-potential levels with the ramp signal from the ramp generator of the s second vertical deflection circuit; and
   means responsive to said comparing means for blanking the cathode ray tube beam when said last-named ramp signal is less than or greater than said last-named low and high potential levels, respectively.

4. The system of claim 2 further including means for producing alarm signal when said tachometer signal is less than and greater than said low and high-potential levels, respectively.

5. The system of claim 1, wherein said means for producing said tachometer signal includes:
   means for filtering out interference signals from said repetitive analog signal;
   full-wave rectifier means responsive to said filtering means;
   means responsive to said full-wave rectifier means for detecting the peaks of said repetitive analog signal;

pulse-generating means for producing output pulses in response to the peaks detected by said peak-detecting means; and means for averaging said output pulses to produce said tachometer signal.

6. The system of claim 5, wherein said peak detecting means includes:

means for averaging a predetermined number of the repetitive portions of the rectified analog signal; and means for producing an output signal when said analog signal is greater than the averaged signal from said last-named averaging means.

7. The system of claim 1, said ramp generator means of said first horizontal deflection circuit being operable to produce ramp signals having a predetermined duty cycle $t_1$;

said ramp generator means of said second horizontal deflection circuit being operable to produce ramp signals having a predetermined duty cycle $t_2$ which is substantially less than $t_1$; and said controlling means including clock pulse-generating means for simultaneously driving said horizontal and vertical chopper means, said clock pulse generating means being operable to produce clock pulses separated by a time interval $t_3$ which is intermediate $t_1$ and $t_2$.

8. The system of claim 7 further including pulse-generating means responsive to said clock pulses for triggering the ramp generator of said second horizontal deflection circuit and for blanking said cathode ray tube beam when said horizontal and vertical chopper means switch between said first and second horizontal and vertical deflection circuits.